(12) United States Patent
Azizi et al.

(10) Patent No.: US 9,571,324 B2
(45) Date of Patent: Feb. 14, 2017

(54) METHOD FOR IMPROVING SPECTRAL EFFICIENCY IN WI-FI OFDM SYSTEMS

(71) Applicant: Intel IP Corporation, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 14/125,980

(22) PCT Filed: Jul. 23, 2013

(86) PCT No.: PCT/US2013/051713
§ 371 (c)(1),
(2) Date: Dec. 13, 2013

(87) PCT Pub. No.: WO2015/012816
PCT Pub. Date: Jan. 29, 2015

(65) Prior Publication Data
US 2016/0142242 A1   May 19, 2016

(51) Int. Cl.
*H04L 27/26* (2006.01)
*H04L 5/00* (2006.01)
*H04L 12/801* (2013.01)

(52) U.S. Cl.
CPC ......... *H04L 27/2657* (2013.01); *H04L 5/0007* (2013.01); *H04L 5/0051* (2013.01); *H04L 27/2613* (2013.01); *H04L 27/2649* (2013.01); *H04L 27/2662* (2013.01); *H04L 27/2675* (2013.01); *H04L 27/2692* (2013.01); *H04L 47/12* (2013.01); *H04L 5/0064* (2013.01)

(58) Field of Classification Search
CPC .. H04L 27/2662; H04L 5/0007; H04L 1/0057; H04L 1/24; H04L 2027/0057; H04L 2027/0067; H04L 27/2628; H04L 27/2634; H04L 27/265; H04L 27/2655; H04L 27/2657
See application file for complete search history.

(56) References Cited

U.S. PATENT DOCUMENTS 6,359,938 B1 * 3/2002 Keevill ................. H04L 1/0054
                                                                370/206
8,488,442 B1 * 7/2013 Narasimhan ........ H04L 25/0228
                                                                370/210

(Continued)

OTHER PUBLICATIONS

"International Application Serial No. PCT/US2013/051713, International Search Report mailed Mar. 26, 2014", 3 pgs.

(Continued)

*Primary Examiner* — Dang Ton
*Assistant Examiner* — Sai Aung
(74) *Attorney, Agent, or Firm* — Schwegman Lundberg & Woessner, P.A.

(57) ABSTRACT

Wireless networks that use orthogonal frequency division multiplexing require a receiving device to accurately acquire and maintain synchronization with a transmitting device with respect to carrier and sampling frequency for coherent demodulation. Described herein are techniques for enabling such synchronization using pilot signals with reduced transmission overhead.

19 Claims, 5 Drawing Sheets

(56) References Cited

U.S. PATENT DOCUMENTS

| | | | |
|---|---|---|---|
| 2002/0034213 A1 | 3/2002 | Wang et al. | |
| 2004/0146123 A1* | 7/2004 | Lai | H04L 1/20 |
| | | | 375/329 |
| 2004/0196915 A1 | 10/2004 | Gupta | |
| 2005/0147186 A1* | 7/2005 | Funamoto | H04L 27/2605 |
| | | | 375/324 |
| 2005/0163094 A1* | 7/2005 | Okada | H04L 27/2605 |
| | | | 370/343 |
| 2006/0280113 A1* | 12/2006 | Huo | H04L 5/0048 |
| | | | 370/208 |
| 2009/0232079 A1* | 9/2009 | Khandekar | H04L 27/261 |
| | | | 370/329 |
| 2009/0252239 A1 | 10/2009 | Ma et al. | |
| 2010/0329394 A1 | 12/2010 | Bae et al. | |
| 2012/0314751 A1 | 12/2012 | Suzuki et al. | |

OTHER PUBLICATIONS

"International Application Serial No. PCT/US2013/051713, Written Opinion mailed Mar. 26, 2014", 6 pgs.

* cited by examiner

METHOD FOR IMPROVING SPECTRAL EFFICIENCY IN WI-FI OFDM SYSTEMS

PRIORITY APPLICATION

This application is a U.S. National Stage Application under 35 U.S.C. 371 from International Application No. PCT/US2013/051713, filed Jul. 23, 2013, which is hereby incorporated by reference in its entirety.

TECHNICAL FIELD

Embodiments described herein relate generally to wireless networks and communications systems.

BACKGROUND

Wireless networking based on the Wi-Fi IEEE 802.11 standards is one of the most widely adopted wireless technologies. An 802.11 network is mostly deployed based on a star topology with two types of wireless devices: clients and access points (APs). Access points (APs) provide an infrastructure function by communicating directly with wireless client devices and linking them to other networks such as the internet. This application is applicable to point to point (P2P) topology as well. However, without loss of generality, it is explained for a star topology. WiFi systems typically employ OFDM (orthogonal frequency division multiplexing) as the physical layer. OFDM requires a receiving device to accurately acquire and maintain synchronization with the transmitting device with respect to carrier and sampling frequency for coherent demodulation. Described herein are techniques for enabling such synchronization with reduced transmission overhead.

DETAILED DESCRIPTION

Figure 1:
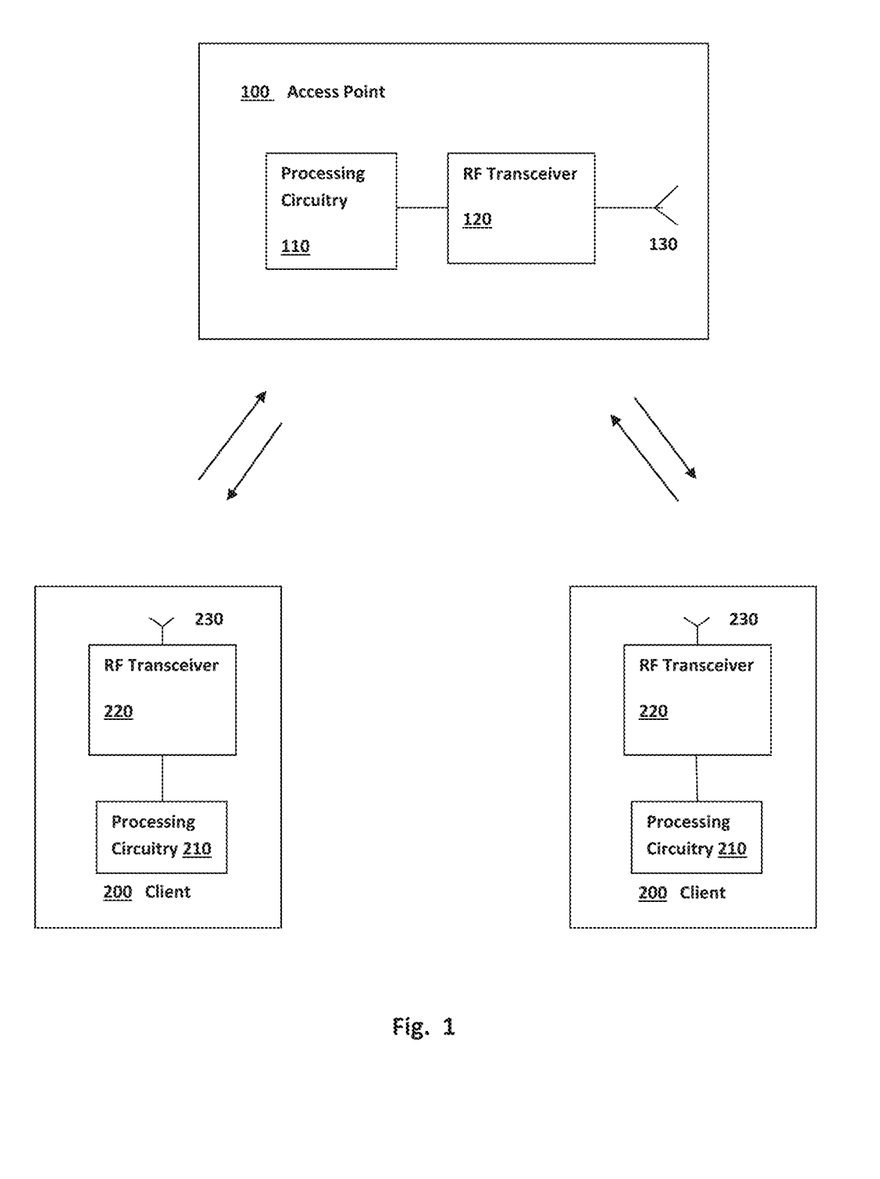
FIG. 1 illustrates example access point and client devices of an IEEE 802.11-type network.

FIG. 1 illustrates an example WiFi system that includes an access point device 100 with one more client devices 200. The access point device 100 includes processing circuitry 110 that is interfaced to an RF (radio-frequency) transceiver 120 having an antenna 130. The client devices 200 are similarly equipped with processing circuitry 210 that is interfaced to an RF transceiver 220 having an antenna 230. The devices may be further equipped with multiple RF transceivers and antennas to enable spatial multiplexing of transmissions or MIMO (multiple input multiple output) operations. WiFi devices may use OFDM as the physical layer where a series of OFDM symbols (explained below) are grouped together in packets and transmitted using a CSMA/CA (carrier sensing multiple access/collision avoidance) mechanism for medium access control. Each packet begins with a preamble for use by the receiver in acquiring time and frequency synchronization.

In OFDM, digital data is mapped to complex-valued symbols using a digital modulation scheme such as QAM (quadrature amplitude modulation) which symbols are then used to modulate a number of closely spaced and orthogonal subcarriers or tones. The subcarriers are upconverted to an appropriate carrier frequency for the radio channel and transmitted in parallel. Because the modulation of the subcarriers is usually performed using an inverse discrete Fourier transform, the symbols used for that modulation may be referred to as frequency-domain symbols.

Figure 2:
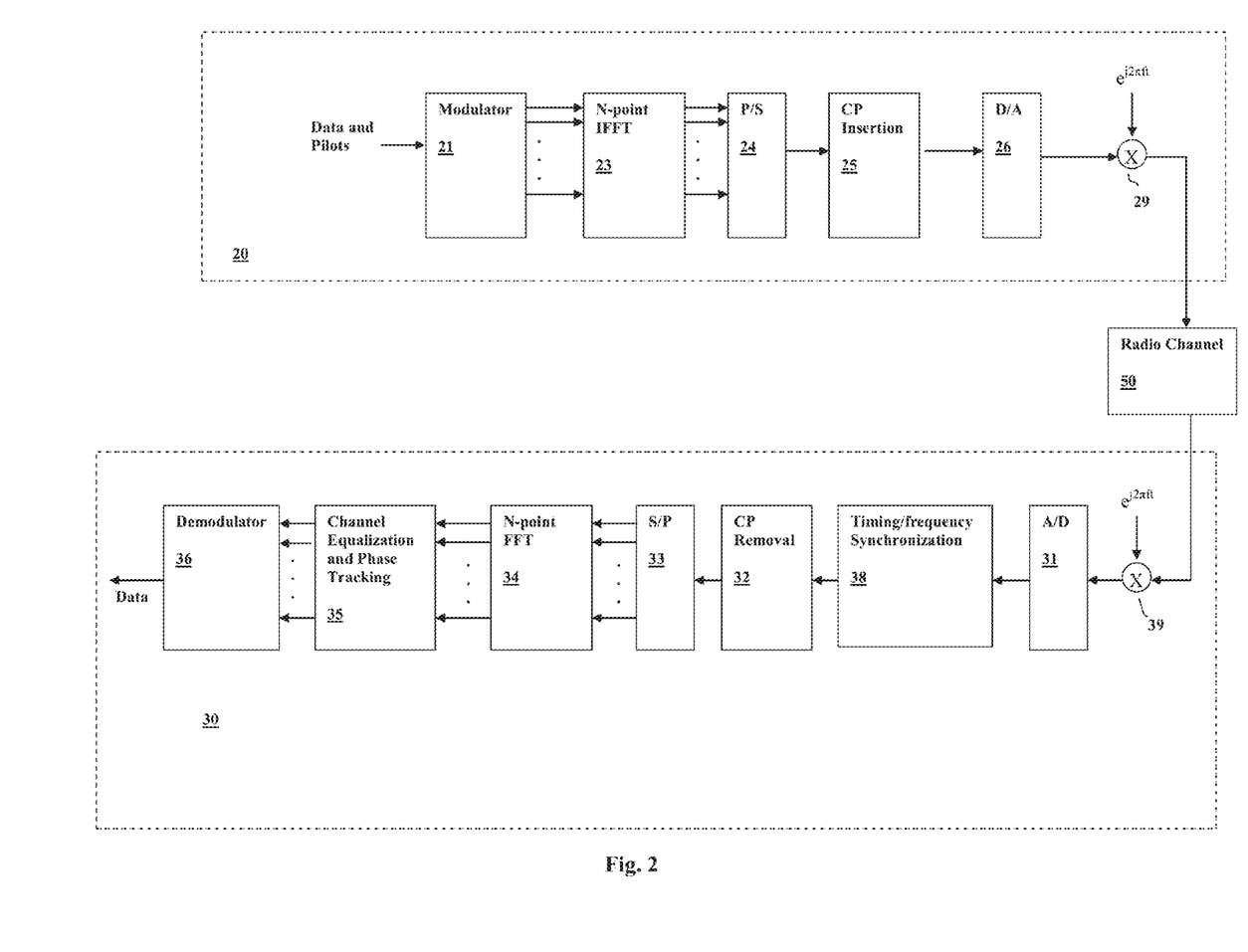
FIG. 2 illustrates a block diagram of an OFDM transmitter and receiver.

FIG. 2 illustrates a block diagram of an OFDM transmitter 20 as could be implemented by the processing circuitry and RF transceiver and an OFDM receiver 30 as could be implemented by the processing circuitry and RF transceiver. The modulator 21 maps the input data to blocks of N complex-valued symbols according to a modulation scheme such as QAM. As noted above, these complex-valued symbols are used to determine the amplitude and phase of a particular subcarrier and may be referred to as frequency-domain symbols. Some of the subcarriers are allocated for use in transmitting known reference symbols for use by a receiver to estimate the channel and to acquire synchronization with the transmitter, referred to herein as pilot signals. The N frequency-domain symbols, each being a complex number representing a plurality of the input bits, are next input to an N-point inverse fast Fourier transform (IFFT) 23 and converted to a serial discrete-time signal by parallel-to-serial converter 24. A cyclic prefix is added at block 25 in order to provide enhanced immunity to multi-path distortion. The resulting discrete-time signal thus constitutes N samples of a time domain waveform representing a sum of orthogonal sub-carrier waveforms with each sub-carrier waveform being modulated by a frequency-domain symbol, the N samples referred to as an OFDM symbol. The time domain waveform samples are converted into an analog waveform by digital-to-analog converter 26, upconverted by mixing with a radio-frequency carrier frequency by mixer 29, and transmitted over the radio channel 50.

At the receiver 30, mixer 39 downconverts the received signal by mixing it with the carrier frequency as generated by a local oscillator. The resulting baseband signal is then filtered and sampled by A/D converter 31. In 802.11-type systems, OFDM symbols are grouped into packets where each packet contains a series of consecutively transmitted OFDM symbols. Detection of the start of a packet and automatic gain control (AGC) setting, as well as initial timing and frequency synchronization, are performed at block 38 using training fields that may be present in the received signal. In 802.11-type systems, such training fields occur in the preamble at the start of a packet. After removal of the cyclic prefix and conversion from serial to parallel as depicted by blocks 32 and 33, respectively, an N-point FFT is performed at block 34 to recover the frequency-domain symbols (i.e., the QAM modulation symbols used to modulate the subcarriers). The frequency-domain symbols are then multiplied by a complex amplitude and phase to compensate for the channel delay spread at equalization block 35. Block 35 also performs phase tracking using pilot signals that are assigned to specified subcarriers of the packet and further multiplies the symbols by a phase factor to compensate for any phase error. The compensated symbols are then demodulated at block 36 to regenerate the transmitted data stream.

As noted above, a WiFi OFDM receiver may utilize packet preambles to acquire initial channel state information and other system parameters such as frequency and timing offset. Since the frequency and timing offset are estimated, however, there is always some residual error. Residual frequency error, due to a mismatch between the local oscillators of the transmitter and receiver used to upconvert and downconvert the OFDM signal, respectively, causes phase noise at the receiver. Phase noise may also result from imperfect operation of the receiver's local oscillator. The mean value of the phase noise over one OFDM symbol, sometimes referred to as common phase error, causes a constellation rotation of all frequency-domain symbols in the OFDM symbol. Here, constellation rotation refers to rotation of the symbol modulating the subcarrier in the complex plane or, equivalently, to a change in the relative magnitudes of the in-phase and quadrature components of the subcarrier. If the common phase error can be determined, it can be compensated for by applying a de-rotation operation to the frequency-domain symbols that reverses the constellation rotation caused by the phase error.

To prevent performance degradation due to phase noise, a WiFi OFDM receiver may track the carrier phase while data symbols are received using pilot signals embedded within each OFDM symbol. For example, in 802.11ah, the 1 MHz system uses a 32 point FFT (32 subcarriers) of which 24 subcarriers are assigned for data use and 2 subcarriers are assigned for pilot signals. This pilot design thus has a significant overhead that reduces overall transmission efficiency. Described herein are techniques for reducing such overhead while still enabling accurate phase tracking by the receiver. In one embodiment, pilot signals are predefined only for M out of N OFDM symbols instead of having pilots in each and every OFDM symbol. The techniques are particular useful in increasing the data rate in 802.11ah systems where operation is limited to very low data rates due to a bandwidth limitation of, for example, 1 MHz.

Figure 3:
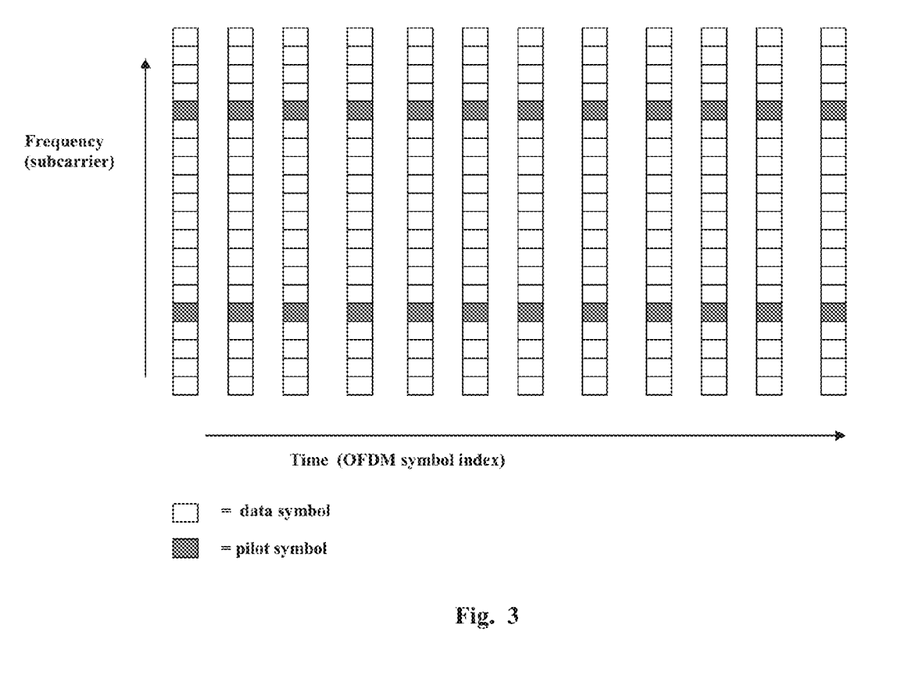
FIG. 3 illustrates a series of OFDM symbols with pilot signals assigned to specified subcarriers.
Figure 4:
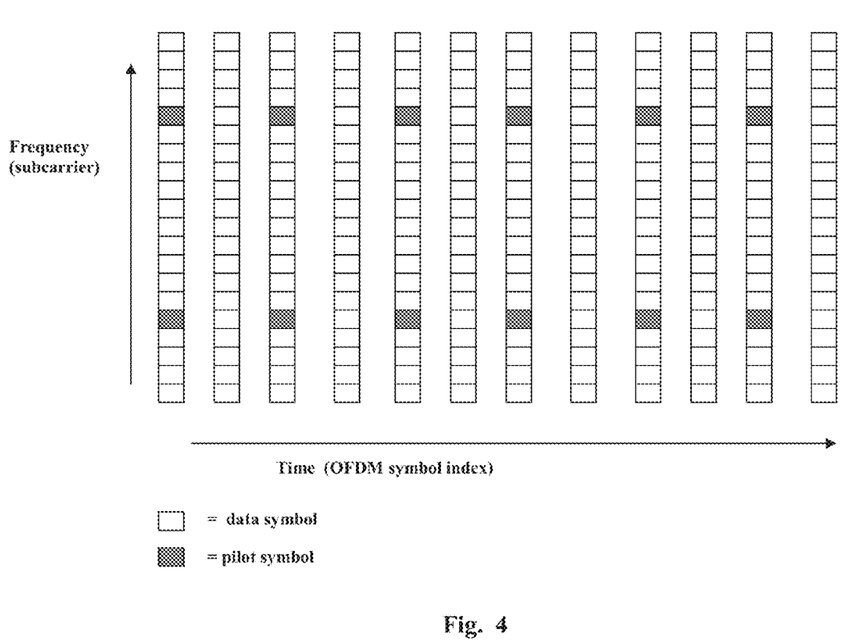
FIG. 4 illustrates a series of OFDM symbols with pilot signals assigned to specified subcarriers in every other OFDM symbol.

FIG. 3 illustrates a WiFi OFDM pilot design where pilot signals in each OFDM symbol are used to continually track channel phase. To reduce pilot signal overhead, one or more subcarriers for carrying pilot signals may instead be predefined for only M out of N OFDM symbols. FIG. 4 illustrates one embodiment of such a scheme where M=1 and N=2 so that two pilot signals are defined only for every other OFDM symbol. At the receiver, in OFDM symbols that carry pilot signals (such as symbol number 1, 3, etc. in FIG. 4), the phase tracking algorithm measures the phase deviation of the pilot signals. Because the phase deviation measurement is a noisy measurement, the phase deviation measurements of the individual pilot signals in an OFDM symbol may be averaged or otherwise combined to arrive at the phase deviation measurement for a particular OFDM symbol. To further reduce the noise, an estimated phase error that is to be used to as a phase correction value for the frequency-domain data symbols may be computed for a current OFDM symbol as a function of the phase deviation measurements of pilot signals contained in the current and previous OFDM symbols.

In one embodiment, the phase tracking algorithm executed by the receiver measures a phase deviation $\phi_i$ based upon the pilot signals in the ith OFDM symbol if such pilot signals are present, while for symbols (such as for OFDM symbol number 2, 4 in FIG. 4) without pilot signals, the algorithm simply outputs the phase deviation measurement from the previous OFDM symbol. The phase deviation $\phi_i$ of OFDM symbol i (either a new measurement or the reuse of a previously measured value) is then inputted to an integrator to calculate the integrated phase error $\Phi_i$ that is applied to data symbols as:

$$\Phi_i = \Phi_{i-1} + \phi_i \beta$$

where $\beta$ is a dynamic integration filter coefficient and where, if $\phi_i$ is a new measurement:

$$\beta = C$$

If $\phi_i$ is a reuse of a previous measurement:

$$\beta = \alpha C$$

where $\alpha$ is a constant that controls the inputted phase correction amount for symbols without pilot signals. The optimum value of the constants C and $\alpha$ may be found through system testing or simulations. In an example embodiment, C is set equal to 0.3 for a 1 MHz 802.11ah system and set equal to 0.6 for 2 MHz or greater systems.

Figure 5:
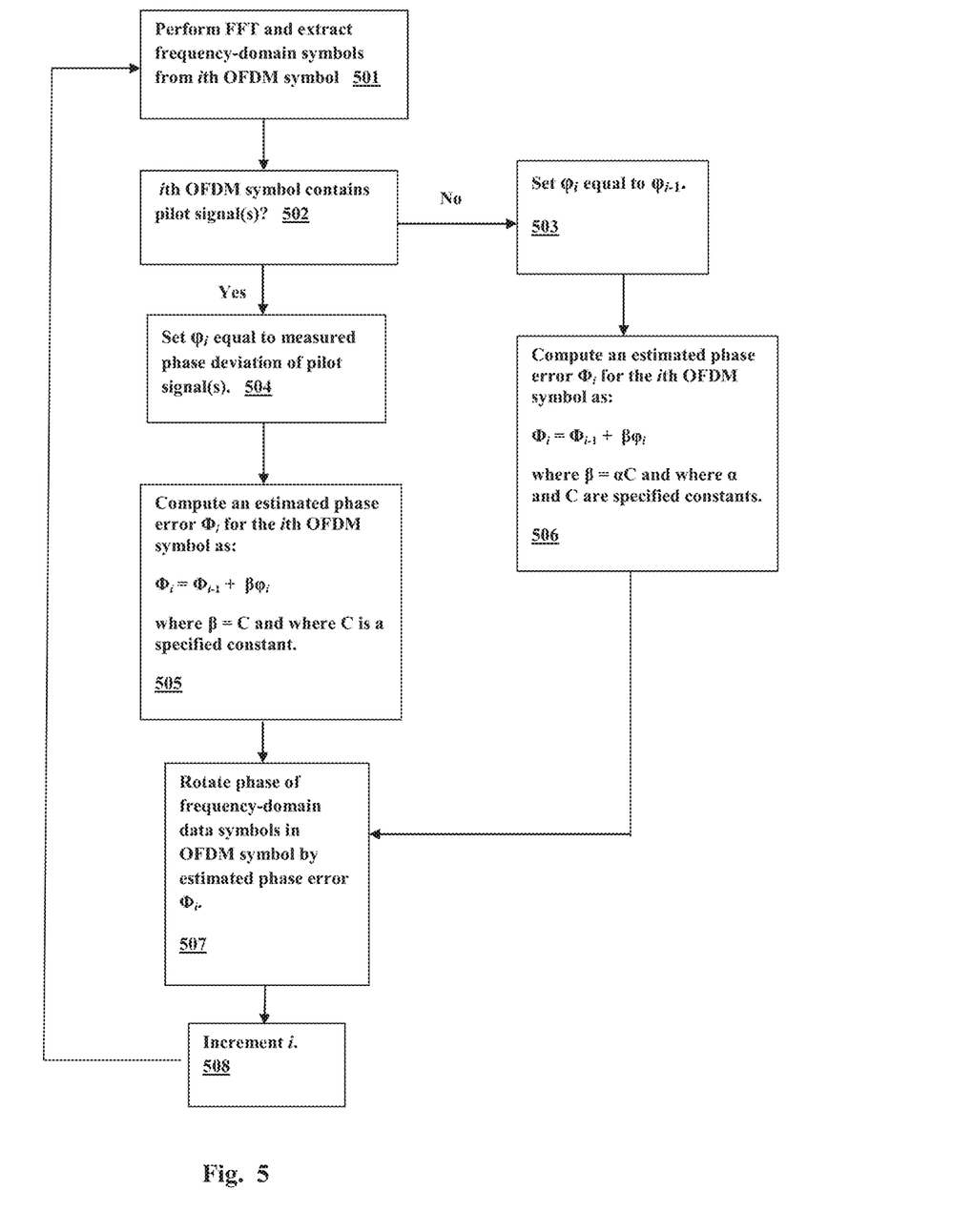
FIG. 5 illustrates an example algorithm for computing an estimated phase error.

FIG. 5 illustrates an example phase tracking algorithm as executed by an OFDM receiver. At 501, the receiver performs the FFT and extracts frequency-domain symbols from ith OFDM symbol. At 502, a determination is made as to whether the ith OFDM symbol contains pilot signals. If so, $\phi_i$ is set equal to the measured phase deviation of pilot signals in the ith OFDM symbol at 504. At 505, an estimated phase error $\Phi_i$ for the ith OFDM symbol is computed as:

$$\Phi_i = \Phi_{i-1} + \beta \phi_i$$

where $\beta = C$ and where C is a specified constant and where the initial value for $\Phi_i$ is acquired during initial timing and frequency synchronization. If the ith OFDM symbol contains no pilot signals, $\phi_i$ is set equal to $\phi_{i-1}$ at 503. At 506, an estimated phase error $\Phi_i$ for the ith OFDM symbol is computed as:

$$\Phi_i = \Phi_{i-1} + \beta \phi_i$$

where $\beta = \alpha C$ and where C and $\alpha$ are specified constant. After computation of $\Phi_i$ at either 505 or 506, the phases of data symbols in the OFDM symbol are rotated by the estimated phase error $\Phi_i$ to compensate for the phase error at 507. At 508, i is incremented and the algorithm proceeds to the next OFDM symbol.

Additional Notes and Examples

In Example 1, a device for receiving a transmitted OFDM (orthogonal frequency division multiplexing) signal, comprises a radio transceiver including a mixer for downconverting a received carrier modulated with OFDM symbols and processing circuitry connected to the radio transceiver to: demodulate OFDM symbols to extract a plurality of frequency-domain symbols from each OFDM symbol; estimate a phase error for the OFDM symbols based upon pilot signals contained in non-consecutively received OFDM symbols and not based upon information contained in other OFDM symbols; and, rotate the phase of non-pilot frequency domain symbols extracted from an OFDM symbol to compensate for the phase error estimated for that OFDM symbol.

In Example 2, the subject matter of Example 1 may optionally include wherein the processing circuitry is further to perform initial timing and frequency synchronization based upon training fields contained in a preamble of a packet containing a series of OFDM symbols.

In Example 3, the subject matter of any of Examples 1-2 may optionally include wherein the processing circuitry is further to estimate the phase error based upon pilot signals contained in M out of every N received OFDM symbols, where M and N are integers and M<N.

In Example 4, the subject matter of any of Examples 1-3 may optionally include wherein the processing circuitry is further to estimate the phase error for a current OFDM symbol as a function of the pilot signals contained in the current and previous OFDM symbols.

In Example 5, the subject matter of any of Examples 1-4 may optionally include wherein the processing circuitry is further to compute an estimated phase error $\Phi_i$ for the ith OFDM symbol as:

$$\Phi_i = \Phi_{i-1} + \beta \phi_i$$

where, if one or more pilot signals are contained in the ith OFDM symbol, $\phi_i$ corresponds to measured phase deviations of the one or more contained pilot signals and $\beta$ is a weighting function.

In Example 6, the subject matter of Example 5 may optionally include wherein the processing circuitry is configured such that, if one or more pilot signals are contained in the ith OFDM symbol, $\phi_i$ corresponds to measured phase deviations of the one or more contained pilot signals but, if no pilot signals are contained in the ith OFDM symbol, $\phi_i$ equals $\phi_{i-1}$.

In Example 7, the subject matter of Example 5 may optionally include wherein the processing circuitry is further configured such that the weighting function $\beta$ is computed, if $\phi_i$ corresponds to a new measurement of phase deviations of pilot signals contained in the ith OFDM symbol, as $$\beta = C$$

where C is a specified constant, but, if no pilot signals are contained in the ith OFDM symbol so that $\phi_i$ equals $\phi_{i-1}$, then $$\beta = \alpha C$$

where $\alpha$ is a specified constant.

In Example 8, the subject matter of Example 7 may optionally include wherein the processing circuitry is further configured such that the constants C and $\alpha$ are both numbers between 0 and 1.

In Example 9, the subject matter of any of Examples 1-8 may optionally include wherein the processing circuitry is further configured such that the measured phase deviation $\phi_i$ of the one or more pilot signals contained in the ith OFDM symbol is computed as an average of individual phase deviations measured for each of the one or more pilot signals.

In Example 10, the subject matter of any of Examples 1-9 may optionally include wherein the processing circuitry is to operate as a client device in an 802.11-type network.

In Example 11, the subject matter of any of Examples 1-9 may optionally include wherein the processing circuitry is to operate as an access point device in an 802.11-type network.

In Example 12, a method for receiving a transmitted OFDM (orthogonal frequency division multiplexing) signal, comprises: receiving a carrier waveform modulated with a series of OFDM symbols; downconverting the received carrier waveform and demodulating the OFDM symbols to extract a plurality of frequency-domain symbols from each OFDM symbol; estimating phase errors for OFDM symbols in the series based upon pilot signals contained in non-consecutively received OFDM symbols and not based upon information in other OFDM symbols; and, compensating for the phase error estimated for an OFDM symbol by de-rotating the phase of non-pilot frequency-domain symbols extracted therefrom.

In Example 13, the subject matter of Example 12 may optionally include estimating the phase error based upon pilot signals contained in M out of every N received OFDM symbols, where M and N are integers and M<N.

In Example 14, the subject matter of any of Examples 12-13 may optionally include estimating the phase error for a current OFDM symbol as a function of the pilot signals contained in the current and previous OFDM symbols.

In Example 15, the subject matter of any of Examples 12-13 may optionally include computing an estimated phase error $\Phi_i$ for the ith OFDM symbol as:

$$\Phi_i = \Phi_{i-1} + \beta \phi_i$$

where, if one or more pilot signals are contained in the ith OFDM symbol, $\phi_i$ corresponds to measured phase deviations of the one or more contained pilot signals and $\beta$ is a weighting function.

In Example 16, the subject matter of Example 15 may optionally include wherein, if one or more pilot signals are contained in the ith OFDM symbol, $\phi_i$ corresponds to measured phase deviations of the one or more contained pilot signals but, if no pilot signals are contained in the ith OFDM symbol, $\phi_i$ equals $\phi_{i-1}$.

In Example 17, the subject matter of Example 16 may optionally include wherein the weighting function $\beta$ is computed, if $\phi_i$ corresponds to a new measurement of phase deviations of pilot signals contained in the ith OFDM symbol, as:

$$\beta = C$$

where C is a specified constant, but, if no pilot signals are contained in the ith OFDM symbol so that $\phi_i$ equals $\phi_j$, then $$\beta = \alpha C$$

where $\alpha$ is a specified constant.

In Example 18, the subject matter of Example 17 may optionally include wherein the constants C and $\alpha$ are both numbers between 0 and 1.

In Example 19, the subject matter of any of Examples 12-18 may optionally include wherein the measured phase deviation $\phi_i$ of the one or more pilot signals contained in the ith OFDM symbol is computed as an average of individual phase deviations measured for each of the one or more pilot signals.

In Example 20, the subject matter of any of Examples 12-19 wherein the series of OFDM symbols are contained in a packet of specified length that includes a preamble at the beginning of the packet and further comprising performing initial time and frequency synchronization based upon training fields in the preamble.

In Example 21, the subject matter of any of Examples 12-20 further includes transmitting pilot signals for estimating phase error only in non-consecutive OFDM symbols.

In Example 22, a system includes the subject matter of any of Examples 1-11 and further includes a transmitter to transmit pilot signals by which a receiver may estimate phase error only in non-consecutive OFDM symbols.

In Example 23, a machine-readable medium containing instructions that, when executed, cause a machine to carry out functions performed by the processing circuitry as recited by any of Examples 1 through 11.

In Example 24, a device for transmitting an OFDM (orthogonal frequency division multiplexing) signal, comprises: processing circuitry to: map input data to complex-valued symbols; generate a series of OFDM symbols, wherein each OFDM symbol comprises a plurality of sub-carriers whose amplitude and phase are determined by the complex-valued symbols to which the input data is mapped; allocate one or more subcarriers of selected OFDM symbols for carrying pilot signals for use by a receiver to determine a phase error, wherein each selected OFDM symbol carrying one or more pilot signal is followed by at least one OFDM symbol that carries no pilot signals; and a radio transceiver including a mixer for upconverting the OFDM symbols with a carrier for transmission.

In Example 25, the subject matter of Example 24 may optionally include wherein the processing circuitry is further to insert training fields in a preamble of a packet containing a series of OFDM symbols, wherein the training fields are for use by a receiver in performing initial timing and frequency synchronization.

In Example 26, the subject matter of Example 24 or 25 may optionally include wherein the processing circuitry is further to allocate pilot signals in M out of every N transmitted OFDM symbols, where M and N are integers and M<N.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as eNode-B.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $\frac{1}{10}$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, Mar. 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A device for receiving a transmitted OFDM (orthogonal frequency division multiplexing) signal, comprising:
 a radio transceiver including a mixer for downconverting a received carrier modulated with OFDM symbols;
 a processing circuitry connected to the radio transceiver to:
 demodulate the OFDM symbols to extract a plurality of frequency-domain symbols from each OFDM symbol;
 estimate phase errors for the OFDM symbols based upon pilot signals contained in non-consecutively received OFDM symbols and not based upon information contained in other received OFDM symbols;
 estimate the phase error for an OFDM symbol not containing a pilot signal as a function of the phase error estimated for a previous OFDM symbol containing a pilot signal; and,
 rotate the phases of frequency domain data symbols extracted from a particular OFDM symbol to compensate for the phase error estimated for that particular OFDM symbol.

2. The device of claim 1 wherein the processing circuitry is further to perform initial timing and frequency synchronization based upon training fields contained in a preamble of a packet containing a series of OFDM symbols.

3. The device of claim 1 wherein the processing circuitry is further to estimate the phase error based upon pilot signals contained in M out of every N received OFDM symbols, where M and N are integers and M<N.

4. The device of claim 1 wherein the processing circuitry is further to compute an estimated phase error $\Phi_i$ for the ith OFDM symbol as:

$$\Phi_i = \Phi_{i-1} + \beta\phi_i$$

where, if one or more pilot signals are contained in the ith OFDM symbol, $\phi_i$ corresponds to measured phase deviations of the one or more contained pilot signals and $\beta$ is a weighting function.

5. The device of claim 4 wherein the processing circuitry is configured such that, if one or more pilot signals are contained in the ith OFDM symbol, $\phi_i$ corresponds to measured phase deviations of the one or more contained pilot signals but, if no pilot signals are contained in the ith OFDM symbol, $\phi_i$ equals $\phi_{i-1}$.

6. The device of claim 1 wherein the processing circuitry is further configured such that the weighting function $\beta$ is computed as:
 if $\phi_i$ corresponds to a new measurement of phase deviations of pilot signals contained in the ith OFDM symbol, then $$\beta = C$$

where C is a specified constant, but, if no pilot signals are contained in the ith OFDM symbol so that $\phi_i$ equals $\phi_{i-1}$, then $$\beta = \alpha C$$

where $\alpha$ is a specified constant.

7. The device of claim 6 wherein the processing circuitry is further configured such that the constants C and $\alpha$ are both numbers between 0 and 1.

8. The device of claim 1 wherein the processing circuitry is further configured such that the measured phase deviation $\phi_i$ of the one or more pilot signals contained in the ith OFDM symbol is computed as a weighted average of individual phase deviations measured for each of the one or more pilot signals.

9. The device of claim 1 wherein the processing circuitry is to operate as a client device in an 802.11-type network.

10. The device of claim 1 wherein the processing circuitry is to operate as an access point device in an 802.11-type network.

11. A method for receiving a transmitted OFDM (orthogonal frequency division multiplexing) signal, comprising:
 receiving a carrier waveform modulated with a series of OFDM symbols;
 downconverting the received carrier waveform and demodulating the OFDM symbols to extract a plurality of frequency-domain symbols from each OFDM symbol;
 estimating phase errors for OFDM symbols in the series based upon pilot signals contained in non-consecutively received OFDM symbols and not based upon information contained in other received OFDM symbols;
 estimate the phase error for an OFDM symbol not containing a pilot signal as a function of the phase error estimated for a previous OFDM symbol containing a pilot signal; and,
 compensating for the phase error estimated for a particular OFDM symbol by rotating the phases of frequency domain data symbols extracted from that particular OFDM symbol.

12. The method of claim 11 further comprising estimating the phase error based upon pilot signals contained in M out of every N received OFDM symbols, where M and N are integers and M<N.

13. The method of claim 11 further comprising computing an estimated phase error $\Phi_i$ for the ith OFDM symbol as:

$$\Phi_i = \Phi_{i-1} + \beta\phi_i$$

where, if one or more pilot signals are contained in the ith OFDM symbol, $\phi_i$ corresponds to measured phase deviations of the one or more contained pilot signals and $\beta$ is a weighting function.

14. The method of claim 13 wherein, if one or more pilot signals are contained in the ith OFDM symbol, $\phi_i$ corresponds to measured phase deviations of the one or more contained pilot signals but, if no pilot signals are contained in the ith OFDM symbol, $\phi_i$ equals $\phi_{i-1}$.

15. The method of claim 11 wherein the weighting function $\beta$ is computed as:
 if $\phi_i$ corresponds to a new measurement of phase deviations of pilot signals contained in the ith OFDM symbol, then $$\beta = C$$

where C is a specified constant, but, if no pilot signals are contained in the ith OFDM symbol so that $\phi_i$ equals $\phi_{i-1}$, then $$\beta = \alpha C$$

where $\alpha$ is a specified constant.

16. The method of claim 15 wherein the constants C and $\alpha$ are both numbers between 0 and 1.

17. The method of claim 11 wherein the measured phase deviation $\phi_i$ of the one or more pilot signals contained in the ith OFDM symbol is computed as an average of individual phase deviations measured for each of the one or more pilot signals.

18. The method of claim 11 wherein the series of OFDM symbols are contained in a packet of specified length that includes a preamble at the beginning of the packet and further comprising performing initial time and frequency synchronization based upon training fields in the preamble.

19. A machine-readable non-transitory medium containing instructions that, when executed, cause a machine to carry out functions performed by a processing circuitry as recited by claim 11.

* * * * *

UNITED STATES PATENT AND TRADEMARK OFFICE
CERTIFICATE OF CORRECTION

PATENT NO. : 9,571,324 B2
APPLICATION NO. : 14/125980
DATED : February 14, 2017
INVENTOR(S) : Azizi et al.

Page 1 of 1

It is certified that error appears in the above-identified patent and that said Letters Patent is hereby corrected as shown below:

In the Claims

In Column 9, Line 62, in Claim 6, after "equals", delete "then"

Signed and Sealed this
Twelfth Day of January, 2021

Andrei Iancu
*Director of the United States Patent and Trademark Office*